A. B. FRENIER.
TEMPERATURE PRODUCING MECHANISM AND CONTROLLING MEANS THEREFOR.
APPLICATION FILED NOV. 17, 1919.

1,379,008.

Patented May 24, 1921.
9 SHEETS—SHEET 3.

A. B. FRENIER.
TEMPERATURE PRODUCING MECHANISM AND CONTROLLING MEANS THEREFOR.
APPLICATION FILED NOV. 17, 1919.

1,379,008.

Patented May 24, 1921.

A. B. FRENIER.
TEMPERATURE PRODUCING MECHANISM AND CONTROLLING MEANS THEREFOR.
APPLICATION FILED NOV. 17, 1919.

1,379,008.

Patented May 24, 1921.
9 SHEETS—SHEET 9.

UNITED STATES PATENT OFFICE.

ALBERT B. FRENIER, OF CHICAGO, ILLINOIS.

TEMPERATURE-PRODUCING MECHANISM AND CONTROLLING MEANS THEREFOR.

1,379,008.  Specification of Letters Patent.  Patented May 24, 1921.

Application filed November 17, 1919. Serial No. 338,463.

*To all whom it may concern:*

Be it known that I, ALBERT B. FRENIER, a citizen of the United States of America, and resident of Chicago, Cook county, Illinois, have invented a certain new and useful Improvement in Temperature - Producing Mechanism and Controlling Means Therefor, of which the following is a specification.

My invention relates to the art of burning liquid fuel as a substitute for solid fuel in connection with furnaces generally, and more especially in connection with steam or hot water boilers or hot air furnaces commonly used for heating homes or other buildings.

In the burning of liquid-fuel, especially non-volatile or heavy hydrocarbons, the fuel is either vaporized—that is, converted from its liquid form into a gas by the application of heat—and the gas so formed is burned in various forms of burners of the Bunsen type, resulting in a short blue flame of considerable intensity; or it is atomized or sprayed and when mixed with the proper proportion of air is capable of practically complete combustion and gives forth an intensely white flame of large voluminous proportion. Atomizing the fuel is usually brought about either by subjecting the liquid to high pressure, forcing it through a jet or nozzle provided with minute outlets, or it is atomized through the agency of high pressure air or steam. This latter method is usually resorted to in connection with forging furnaces or steam boiler plants of factories where practically unlimited space for proper combustion is available. Where the burning of liquid fuel is applied to devices in which the available space for combustion is exceedingly limited or circumscribed, the vaporizing or gasifying method is generally resorted to, but as the fuel must be subjected to high pressure in all vaporizing devices, the element of danger due to the pressure on the fuel lines, the requiring of much machinery in the way of oil pumps and air compressors, together with the constant fouling and clogging up of the gasifying tubes, renders the vaporizing plan unfit for domestic use.

The principal object of my invention is in the utilization of simple dependable and thoroughly automatic means for atomizing the fuel, whereby all the danger incident to gasifying and the use of much complicated mechanism is avoided.

To universally employ a liquid fuel would require either the abandonment of the almost universally used coal-burning furnace, or the provision of means by which to change the coal-burning furnace into a liquid-fuel-burning furnace.

One of the objects of my invention consists in the provision of simple and economical means whereby the ordinary heating furnace designed to burn coal or other solid fuel may be transformed into a heating furnace, designed to safely and properly burn liquid fuel, such as kerosene or other non-volatile hydrocarbons.

By my invention the coal-burning furnace, in its transformation into a liquid-fuel burner, need not be physically altered in a manner or to such a degree as to impair its function in the concentration, regulation and utilization of the heat generated; and the restoration of the furnace as a coal-burner may be accomplished by simply removing the liquid fuel burning apparatus.

Another object of my invention is the providing of means whereby combustion of the liquid fuel when applied to a coal-burning furnace is completed and maintained independently of the combustion chamber or fire-box of such transformed furnace, thus always insuring, through complete combustion, the highest efficiency without regard to the efficiency or inefficiency of the original fire-box, the flaming combustible being confined in a manner to prevent direct contact thereof against the furnace walls or other surfaces, which contact would cause their early disintegration.

Another object is to provide a mechanism at once simple, durable and safe, operated and regulated by a system of controls automatically responsive to variations of temperature of the object being heated or to boiler conditions.

Another object is to provide means to shut off the supply of fuel to the combustion chamber upon failure of ignition.

To more clearly explain my invention, and that it may be more fully understood, I have selected an embodiment best suited for carrying it into effect, and will describe the invention in detail in connection with such apparatus.

In the drawings—

Fig. 2 is an end elevation of a complete unit ready for installation into a boiler or furnace.

The combustion chamber 1, (see Figs. 2–5) consisting of a heavy metal box-like structure provided with the inwardly extending flanges $1^a$ at its upper edge, and the splitter $1^b$ at one end, is supported upon the ash pit floor of the furnace by the adjustable stand 2 through the medium of the lug $1^c$ cast integral with the combustion chamber. Connected to the combustion chamber by the air pipe 3 is the blower housing 4 which contains the fan 5 driven by the motor 6, which may be cast integral with the blower housing or otherwise suitably secured thereto. The blower housing and motor are supported upon the basement floor outside of the furnace by the adjustable stand 7 and the lug 8, which may be cast integral with the blower housing 4.

Figure 5:
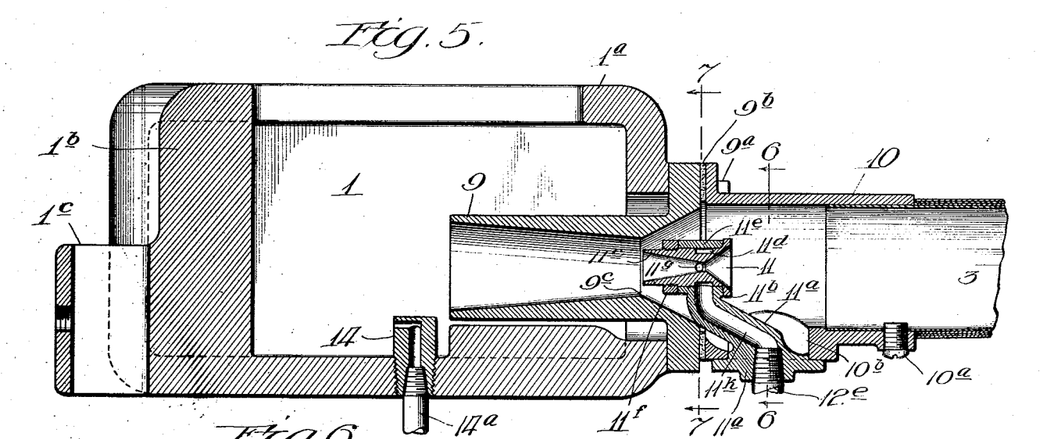
Fig. 5 is a vertical sectional view taken on the line 5—5 of Fig. 3.
Figure 6:
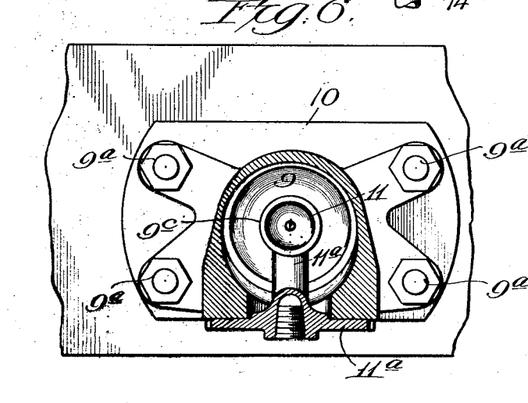
Fig. 6 is a vertical sectional view taken on line 6—6 of Fig. 5.
Figure 7:
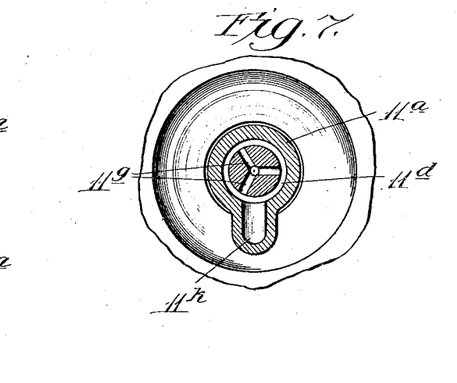
Fig. 7 is a vertical sectional view taken on line 7—7 of Fig. 5.
Figure 8:
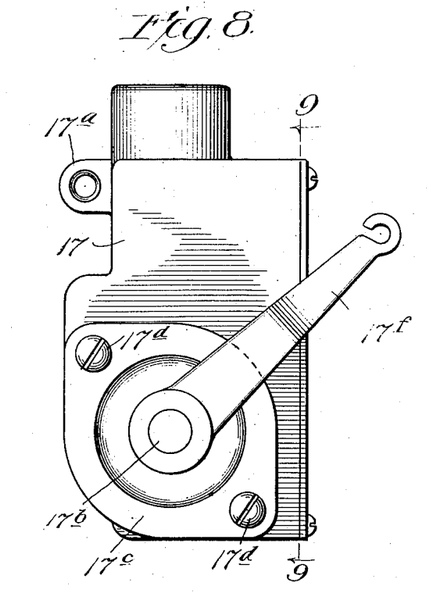
Fig. 8 is an end elevation of the emergency switch and valve-operating mechanism.
Figure 9:
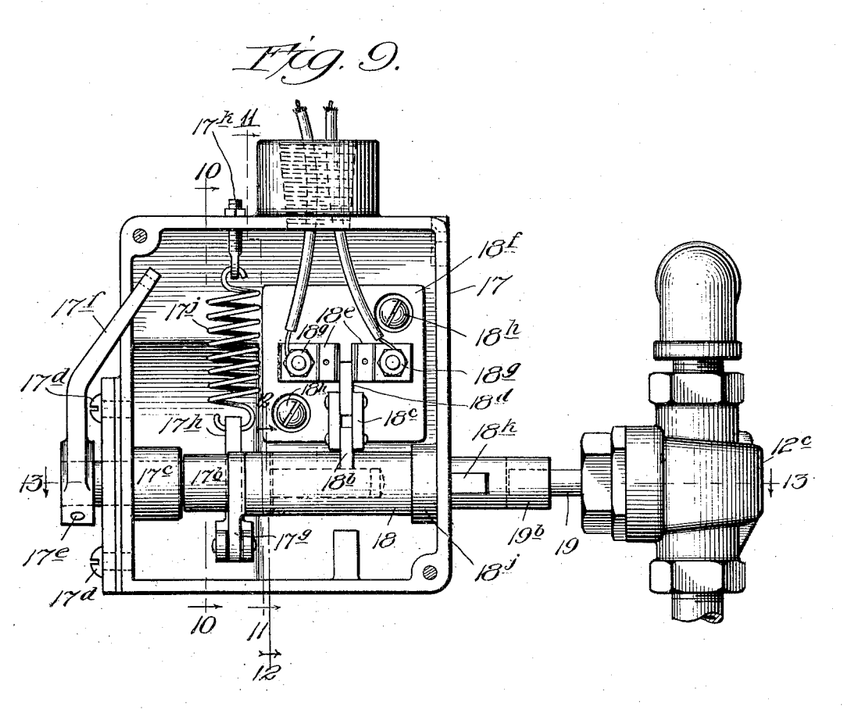
Fig. 9 is a vertical section on line 9—9 of Fig. 8.

Entering into, and secured to the side of, the combustion chamber 1, opposite the splitter $1^b$, is the air venturi 9, and secured to the air venturi by the same cap-screws $9^a$ by which it is fastened to the combustion chamber, but separated therefrom by the insulating gasket $9^b$, is the fuel nozzle retainer 10. To the free end of the fuel nozzle retainer 10, the air pipe 3 is inserted and suitably secured therein as by the set screw $10^a$. An opening $10^b$ is provided in the lower portion of the fuel nozzle retainer 10 to receive the fuel nozzle 11, which is concentrically located relatively to the throat $9^c$ of the air venturi 9 by the holder $11^a$ suitably secured to the underside of the retainer 10 by the cap screws $11^x$. The fuel nozzle is of venturi shape and provided with the flange $11^b$ at one end and the threaded portion $11^c$ at the other end. Exteriorly of, and concentric with, its venturi throat is the channel $11^d$. The fuel nozzle is securely and snugly held within the cylindrical portion $11^e$ of the holder $11^a$ with an airtight fit by the locking nut $11^f$. The air-tight fit is essential to the formation of a vacuum in the chamber formed by the channel $11^d$. Leading from this chamber to the throat of the fuel nozzle venturi are the ports $11^g$. Also communicating with this chamber is the passage $11^k$ in the holder $11^a$ which connects with the fuel pipe $12^d$.

Figure 1:
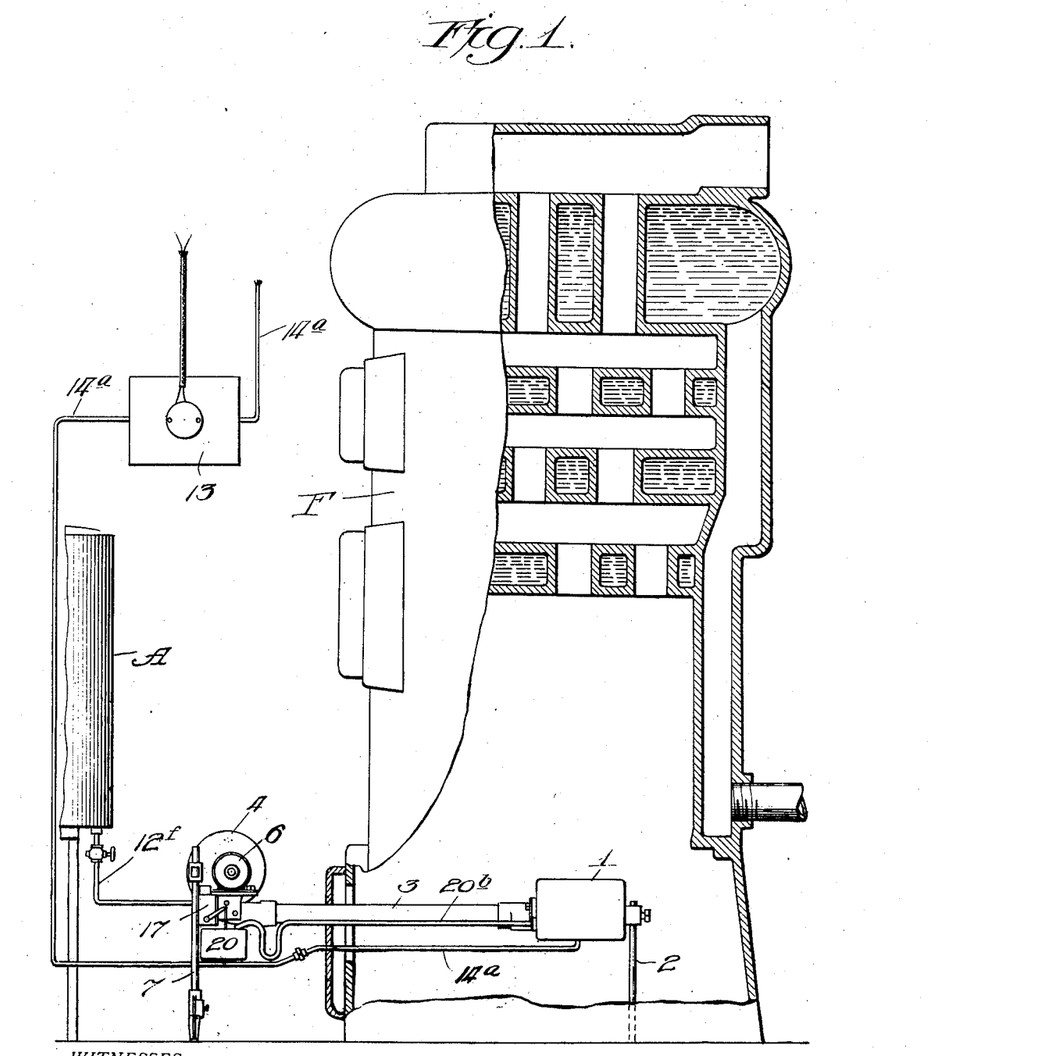
Figure 1 is a diagrammatic view of the device as applied to an ordinary steam or hot water boiler as commonly used for heating homes.
Figure 3:
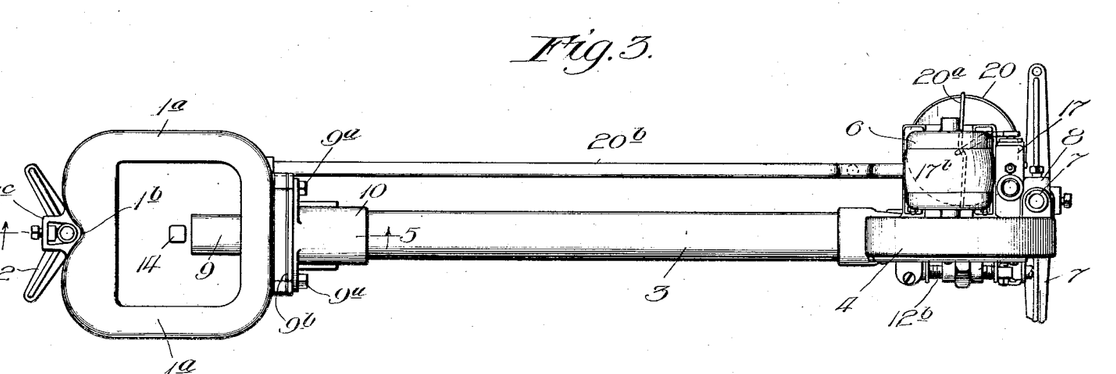
Figs. 3 and 4 are respectively a top plan and side elevation thereof.
Figure 4:
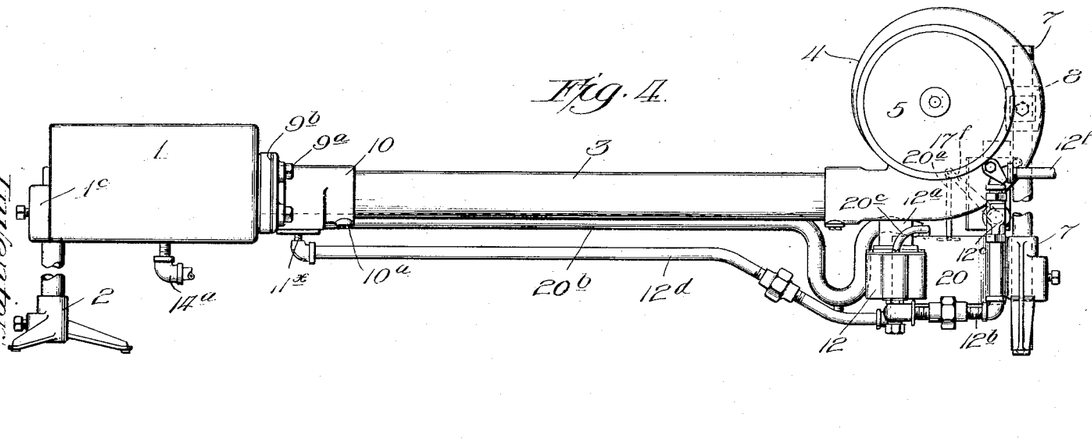

Pendant from the blower housing 4 (see Figs. 2 and 4), as by the bracket $12^a$ is a float chamber 12 of conventional form, consisting of the usual needle valve actuated by a brass ball or cork float, functioning to open or close a port in the bottom of the chamber through which the liquid fuel is admitted into the float chamber. It is connected to the source of supply by the pipe line $12^b$ in which line is located the emergency valve $12^c$, hereinafter more fully referred to, the outlet side of the float chamber being connected to the fuel nozzle 11 by the fuel pipe $12^d$ at the threaded inlet $12^e$ of the fuel nozzle. Connection is made with the fuel storage tanks A (Fig. 1) at $12^f$. The tanks A are elevated sufficiently to cause the fuel to flow to the float chamber by gravity. The float is so adjusted as to maintain the level of the fuel at about the center of height of the float chamber. When the apparatus is in operation, the fuel must be lifted by aspiration from this level to the fuel nozzle, in practice, a distance of three or four inches.

Figure 20:
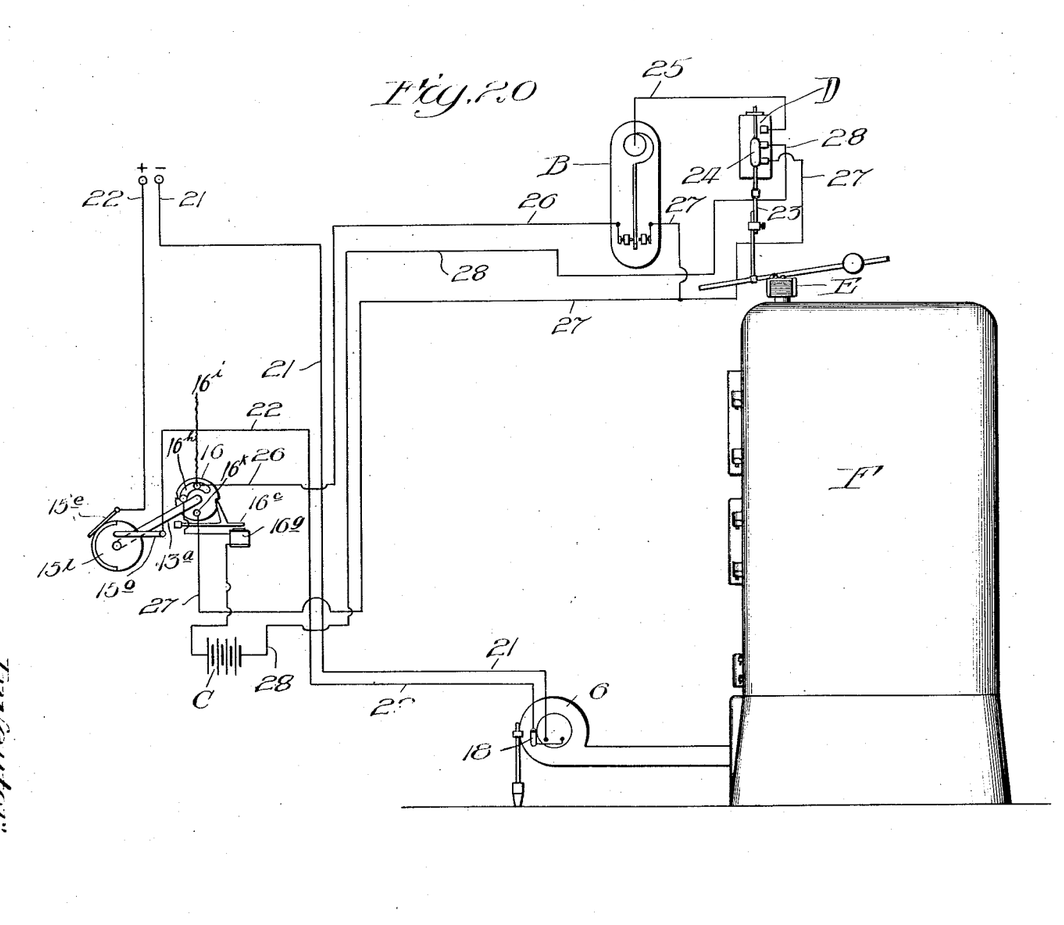
Fig. 20 is a circuit diagram of the electric controlling circuits.
Figure 21:
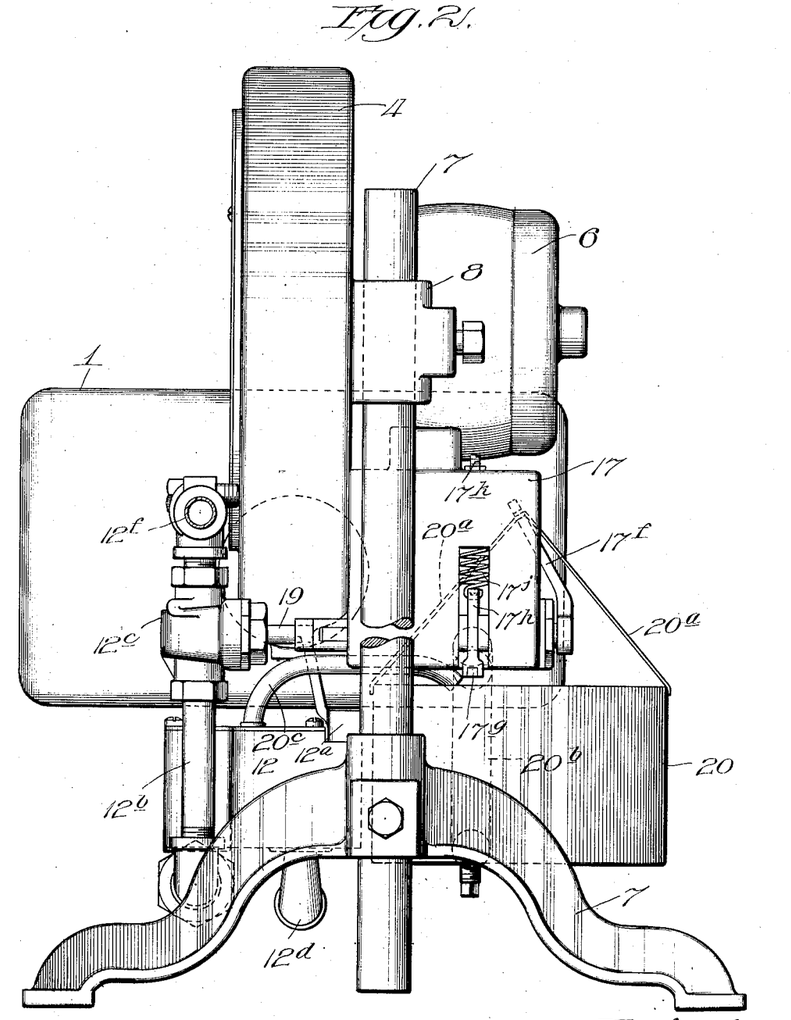

Located on the basement wall or other support adjacent the boiler is the heat regulator 13, which may be of the ordinary spring motor type or may be electrically operated. The one shown (see Figs. 17 and 18) is provided with the usual clock works, indicated in dotted lines in Fig. 18, operated by a heavy spring to be wound in the usual manner by a key or crank. On the main shaft 13ᵃ, which is operated by the "clock" spring, the cam 16 is secured. This cam is provided with the oppositely disposed notches 16ᵃ. The shaft 13ᵃ is prevented from rotating when the spring motor is wound by the engagement of one of the notches with the end of the dog 16ᵇ, which is integral with the counter-weighted lever 16ᶜ pivotally supported by the standards 16ᵈ, as shown. One end of the lever 16ᶜ is provided with the counter-weight 16ᵉ while the opposite end is supplied with the armature plate 16ᶠ so positioned relative to the electromagnet 16ᵍ as to be attracted and actuated thereby. This electromagnet is controlled by a thermostat located in the living-room to be heated, as is common practice in connection with coal-fired heating plants, as indicated in Fig. 20.

Figure 14:
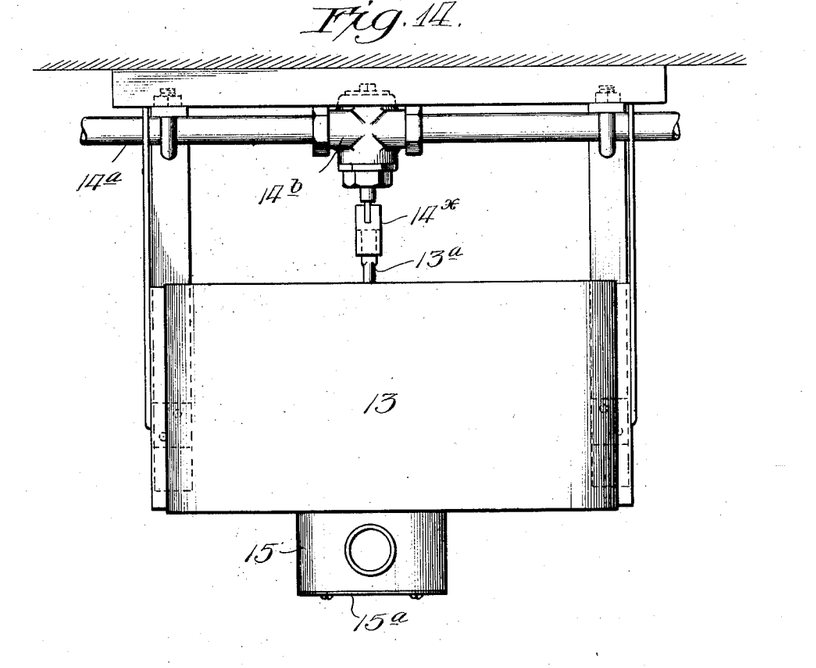
Fig. 14 is a top plan view of the heat regulator, showing the receptacle on the forward side to receive the electric switch and the connection to the pilot light valve on the rear side.

The pilot light 14, supplied from the city gas line, is located in the floor of the combustion chamber 1 directly in front of, and slightly beneath the end of, the air venturi 9. It is connected by the pipe 14ᵃ (Fig. 1) to the gas valve 14ᵇ located in the rear of the heat regulator 13, which valve is operatively connected by the self-adjusting coupling 14ˣ (see Fig. 14) to the shaft 13ᵃ; connection is also made from the valve 14ᵇ to the city gas line. This valve (see Fig. 19) is of the usual plug type consisting of the body portion 14ᶜ, the plug valve and stem 14ᵈ, the packing gland 14ᵉ and the gland nut 14ᶠ. The bottom portion of the valve body is provided with the port 14ᵍ functioning as a by-pass, permitting the pilot light to burn continuously in a low flame. The by-pass is provided with the adjusting screw 14ᵏ whereby the size of the low burning pilot flame may be regulated.

Figure 15:
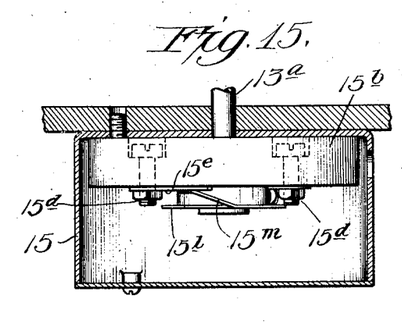
Figs. 15 and 16 are detail sectional views of the electric switch.
Figure 16:
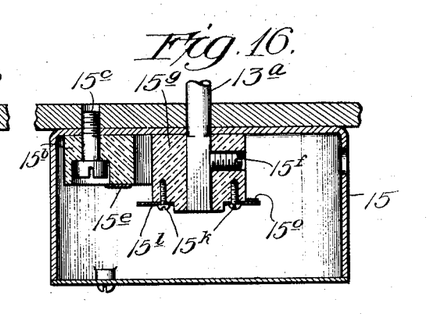
Figure 17:
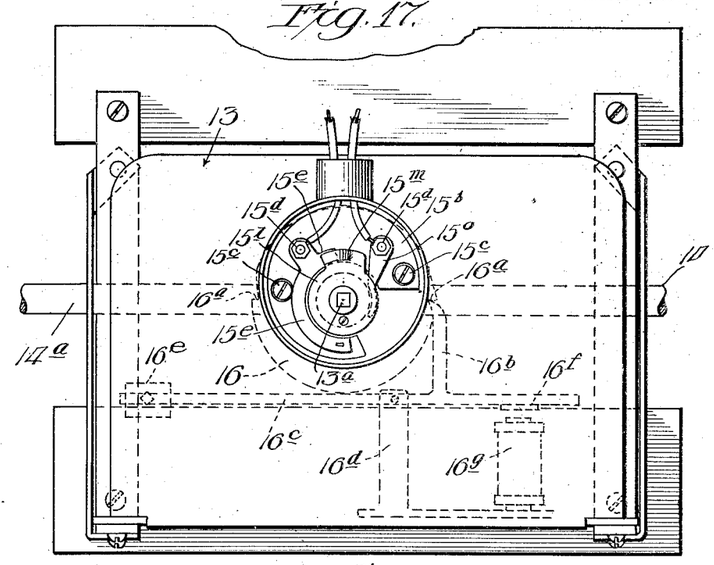
Fig. 17 is a front elevation of the heat regulator showing in dotted lines the electromagnetic means for controlling the switch shaft.
Figures 18, 19:
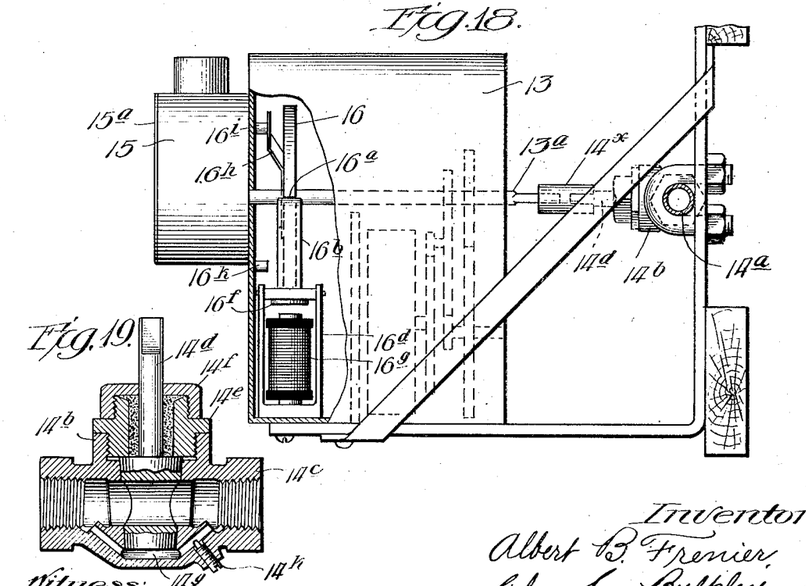
Fig. 18 is an end elevation of Fig. 14 partly broken away to show the electromagnetic controlling means, and indicating in dotted lines spring-controlled means for operating the shaft.
Fig. 19 is a detail sectional view of the pilot light valve.

The electric switch mechanism controlling the circuit to the blower motor is located in the condulet 15, which may be made integral with or otherwise suitably secured to the housing of the heat regulator 13. It is provided with the cover plate 15ᵃ and is located relative to the heat regulator at a point to receive the end of the shaft 13ᵃ through its center. This switch (see Figs. 15–17) consists of a practically crescent-shaped insulating block 15ᵇ properly secured to the bottom of the condulet 15 and the spring regulator housing by the screws 15ᶜ. Secured to the block 15ᵇ, and properly insulated from the condulet, are the terminals 15ᵈ. Rigidly secured to one of the terminals and to the face of the block 15ᵇ is the sector-shaped contact member 15ᵉ. Rigidly secured to the end of the shaft 13ᵃ by the set-screw 15ᶠ and capable of rotation with the shaft is the circular spool-like insulating block 15ᵍ. Secured to the outer end of this block by the screws 15ᵏ is the washer-like metallic member 15ˡ, with its periphery extending considerably beyond that of the spool forming an overhanging ledge. Extending beyond the periphery of the washer 15ˡ and formed integrally thereof is the rearwardly extending contact finger or brush 15ᵐ. The rotating block 15ᵍ is so positioned relative to the stationary block 15ᵇ that the free end of the finger 15ᵐ will travel in the plane of and contact with the sector 15ᵉ. Secured to the other terminal 15ᵈ is the outwardly and downwardly extending contact finger or brush 15ᵒ with its free end contacting the underside of the extending portion of the washer 15ˡ, maintaining the brush 15ᵐ, (which is an integral part of 15ˡ), in electrical communication with the terminals 15ᵈ. As shown in Fig. 17, the brush 15ᵐ being in contact with the sector 15ᵉ, the switch is closed. The shaft 13ᵃ on making the next half revolution will carry the brush 15ᵐ to a point 180° from the position shown, clear of the sector 15ᵉ, opening the circuit.

Figure 12:
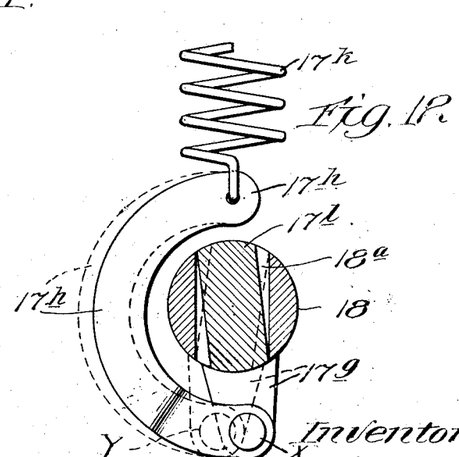
Figure 13:
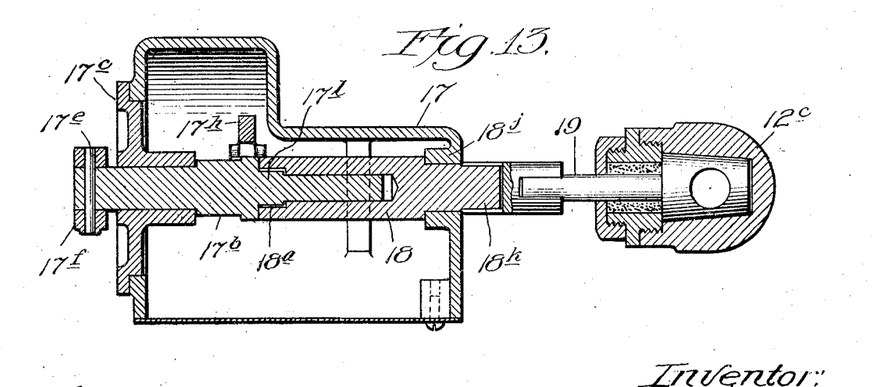

As a means of stopping the entire mechanism and closing a valve in the fuel line from the storage tanks to the burner, in the event the city gas should be shut off temporarily, or the gas pressure reduced (through unusual consumption throughout the city at certain hours or otherwise) to a point where the pilot light would become extinguished and there would be no resultant flame to ignite the fuel when the thermostat functioned causing fuel to be fed into the furnace, a combined safety switch and valve-operating device 17 is provided, suitably secured to the blower housing 4 as by the lug 17ᵃ. In the lower portion of the switch housing 17 (see Figs. 8–13), the spring-actuated member 17ᵇ is journaled for free and easy rotation in the bearing 17ᶜ, which is securely fastened to the side of the housing by the screws 17ᵈ. Secured to the outer end of the member 17ᵇ, as by the pin 17ᵉ, is the arm 17ᶠ. The inner end of this member 17ᵇ is of reduced diameter and piloted into the switch member 18. Extending from and formed integral with the member 17ᵇ is the arm 17ᵍ, which is connected by the half-circle section 17ʰ to the tension spring 17ʲ, which in turn is adjustably secured to the housing 17 by the adjusting screw 17ᵏ, whereby the desired tension can be put into the spring. The inner end of the member 18 is slotted at 18ᵃ to receive the flattened portion 17ˡ of the member 17ᵇ, (as shown in Figs. 12–13). It will be observed that this flattened portion 17ˡ is of less width than the slot 18ᵃ, and as the engagement of the flattened portion 17ˡ with the slot 18ᵃ forms the only means of transmitting rotary movement to the member 18 by the member 17ᵇ, the member 17ᵇ is capable of a limited initial rotary movement without imparting movement to the member 18, thus forming a "lost motion"

connection between these two members for purposes that will more fully hereinafter appear.

Formed integral with the member 18 is the arm 18^b (Figs. 9–11) which, with the insulating connectors 18^c and the metallic member 18^d, forms the blade of a knife switch arranged to engage with the stationary contacts 18^e secured to the insulating block 18^f by the screws 18^g. The block 18^f in turn is suitably secured to the housing 17 as by the screws 18^h. The outer portion of the member 18 is rotatively journaled in the bearing 18^j and is provided with the flattened end 18^k extending out beyond the switch housing 17, where it is made to engage the stem 19 of the fuel valve 12^c by the universal coupling 19^b. This valve 12^c is of the usual plug type provided with a closed body and packing gland and nut to guard against possible leaks.

To the arm 17^f, which is pinned to the member 17^b, is suspended the drain or overflow receptacle 20 (see Fig. 2), through the medium of the bail 20^a. Leading from the combustion chamber 1 is the drain pipe 20^b (see Figs. 1, 3 and 4). This drain pipe is screwed into the combustion chamber near the floor line thereof and to one side of the air venturi 9, and leads to the drain receptacle 20. It is provided near its free end with the U-bend functioning as a trap to prevent the possible escape of products of combustion.

The operation of the entire mechanism is as follows:—After suitable connections have been made with the gas main and fuel supply, the pilot light 14 is ignited and burns with a low flame, due to the fact that the valve 14^c is at this time closed, the gas passing through the by-pass 14^g. When the thermostat B operates, owing to a drop in room temperature, to close the circuit through the magnet 16^g, this magnet operates to withdraw the pawl 16^b from the notch 16^a in the cam 16, thus releasing this cam and permitting the clock-work mechanism to rotate the shaft 13^a a one-half revolution. When the pilot light is burning with a low flame and the fuel supply shut off, then the brush 15^m is out of contact with the segment 15^e, and, therefore, the circuit for the blower-motor is broken. As soon as the shaft 13^a starts to rotate in the manner above described, the plug 14^d of the gas valve 14^c starts to rotate so as to open the main passageway to the pilot light, thus permitting this light to increase in size and burn with a full flame. As the shaft continues to rotate, the brush 15^m engages the end of the contact segment 15^e, thus closing the circuit for the blower motor 6.

The rush of air from the pipe 3 extending from the blower to the combustion chamber through the fuel nozzle, produces a vacuum in the chamber 11^d drawing up or aspirating the liquid fuel through the passage 11^k of the holder 11^a, atomizing it into a fine spray and blowing it into the combustion chamber mixed with the proper amount of air to support complete combustion. It will thus be observed that a portion of the large volume of low pressure air from the air pipe 3 passes through the fuel nozzle functioning principally as an aspirating and atomizing agency, and the remainder of the air passes around outside of the fuel nozzle into the air venturi 9, speeded up and brought into intimate contact and thoroughly mixed with the sprayed fuel at the Venturi throat 9^c, thus producing a combustible sprayed vapor which is blown into the combustion chamber and there ignited by the pilot light.

The flaming combustible is projected by the blower with that degree of force which will overcome the natural tendency of the flame to rise, and the reactive force of the side walls and instanding flange or divider is utilized to continuously turn the flame back upon itself until combustion is complete. Since this vertical baffle or divider is directly in the path of the stream of flame from the mixture forming mechanism, the flame is divided thereby and turned laterally in two directions with the result that a double vortex of horizontally moving flame is produced. Each of the divisions of flame is projected along the walls of the chamber and at the curved corners is repeatedly turned back into the vortex. Any further tendency of the flame, if any there be, to rise out of the combustion chamber is offset by the reactive force of the continuous baffle flange surrounding the upper edge of the combustion chamber. When installed in the fire-box of the ordinary house heating furnace or boiler, this combustion chamber not only functions to prevent the flaming combustible contacting the walls of the fire-box, but what is of greater importance it forms a means whereby complete diffusion of the gases incident to the proper burning of the fuel is effected prior to combustion rather than subsequent thereto.

It is well understood by those versed in the art that in the burning of fuel, either hard or liquid, complete combustion is attained when the carbon, or combustible matter in the fuel, is burned to form $CO_2$ gas, liberating 14,500 B. T. U. per pound of carbon and that incomplete combustion follows when the carbon is burned to form CO gas, yielding but 4450 B. T. U. per pound of carbon. To burn hard fuel in the ordinary house heating furnace or boiler, to form $CO_2$ gas to the exclusion of CO, requires the constant attention of a skilled fireman—it is in fact a purely laboratory achievement seldom if ever accomplished in actual practice. While the task of producing $CO_2$ gas to the exclusion of CO is easier of attainment in the burning of liquid fuel by the atomizing process as heretofore practised, many radical changes must be made in the physical structure of the fire-box of the furnace when liquid fuel is to be substituted for hard fuel and a constant manipulation of the ash pit and stack dampers becomes necessary. When an atom of carbon is brought in contact with an atom of oxygen at a sufficiently high temperature, combustion takes place forming CO gas, and unless this CO molecule so formed meets with or is met by another atom of oxygen before its temperature has fallen below the ignition point, it will pass off through the smoke stack as CO gas, carrying with it ⅔ of the heat units which it is capable of yielding. The large voluminous flame from the burning of liquid fuel by the atomizing process, as heretofore practised, therefore requires a large, spacious fire-box which must be kept at an exceedingly high temperature to insure that every CO molecule will combine with that other atom of oxygen necessary to complete combustion. Under these circumstances proper diffusion of the gases takes place subsequent to combustion, if at all, and herein lies the greatest obstacle to complete combustion of liquid fuel, as the constant high temperature of the fire-box and the introduction of the proper amount of oxygen by the admission of air through manipulating dampers requires the constant services of the skilled attendant.

In projecting the finely divided fuel mixed with the proper amount of air into the combustion chamber herein referred to, a furnace has been effected, the walls of which are walls of white-hot flame wherein every molecule of CO simultaneous with its formation is met by and combines with that other atom of oxygen to the immediate formation of $CO_2$. The time element so difficult to control in the combustion of coal or oil by the methods heretofore practised is here absent. The CO molecule and the oxygen are here confined by the swirling action a sufficient time to insure their combination. The CO molecule cannot get away and wander about, as it were, until loss of temperature below ignition point would render combination impossible.

As the successful burning of liquid fuel by the usual atomizing process as heretofore practised, resulting in a large mass of flame, can only be acquired by insuring proper diffusion of the gases subsequent to combustion, and as this subsequent diffusion demands a constant uniform high temperature of the fire-box, coupled with expert diligence in the regulation of air supply, the use of liquid fuel for the heating of homes, wherein the demand for temperature is intermittent and the manipulation of the heating plant is in the hands of the unskilled, has been impracticable, if not impossible. However, by the use of this auxiliary combustion chamber in conjunction with the fire-box of the ordinary house heating furnace, the necessity of maintaining that constant uniformly high temperature of the fire-box and this expert diligence in the matter of air regulation to insure proper diffusion of the gases subsequent to combustion is completely avoided regardless of shape, size, or contour of such fire-box or the intermittent demand for temperature.

As the shaft $13^a$ completes its half revolution, it is brought to a stop by the pawl $16^b$ engaging with the opposite notch $16^a$ in the cam 16, as the circuit through the magnet $16^g$ was broken as soon as the finger $16^h$ moved out of contact with the corresponding lug or post $16^i$. In this position of the parts, indicated in Fig. 17, the circuit for the blower motor is maintained closed, but the gas valve upon completing the half revolution has again been turned into position to close the main passageway to the pilot light, and thus the pilot light again reduced to a small flame.

It is well known to those familiar with the art that a mixture of non-volatile heavy hydrocarbon, such as kerosene, at normal temperature, and air in sufficient quantity to support complete combustion to the exclusion of soot, smoke or odor, is most difficult to ignite. It is non-ignitible by an electric spark regardless of the temperature of the spark. Even a flame of the proportion of an ordinary pilot light is insufficient to insure ignition, especially at low temperature. In subjecting the fuel and air to the action of a Venturi tube the matter of ignition becomes all the more difficult, in fact under such conditions and especially at low atmospheric temperature the electric spark or small pilot flame utterly fails. This seems to be due to the fact that the small particles of atomized liquid when subjected to the action of a Venturi tube are traveling at such a high rate of speed they are not in the zone of heat of the spark or small flame, a sufficient length of time whereby their temperature can be raised to the point of ignition, and if perchance one or more of these particles should become ignited it is so far removed from its neighbor, in a mixture sufficiently rarefied to support complete combustion, that propagation of flame is impossible.

To insure prompt and unfailing ignition of such a mixture from a cold state the employment of a flame of considerable proportions is absolutely essential, and this large flame must endure for a proper period of time. It cannot be flashed on and off instantly but must persist for several seconds. The large flame seems necessary so that more particles of the liquid shall be in the zone of heat at one time and for a sufficient period that their temperature shall be raised to the point of ignition. Thus it becomes apparent, in connection with the apparatus herein described, that by expanding the city gas pilot light to a flame of considerable size, in fact entirely filling the combustion chamber with such flame and by causing same to persist for a considerable predetermined period, in practice about twenty seconds, prompt and unfailing ignition is insured regardless of atmospheric temperature.

It will be observed that with the switch in its closed position, as shown, the free end of the brush 15$^m$ contacts the sector 15$^e$ an appreciable distance from its end, so that upon opening of the circuit by the half revolution of the shaft 13$^a$ the circuit remains unbroken until after the shaft has made a partial revolution, and the brush 15$^m$ has cleared the end of the sector. So likewise upon completion of this half revolution of the shaft 13$^a$ the end of the brush 15$^m$ will come to a state of rest at a distance from the lower end of the sector 15$^e$ equal to the distance it overlapped the sector with the switch in closed position. By this construction the pilot flame is considerably expanded by the partial opening of the gas valve before the circuit to the blower motor is closed, so that the strong blast of air immediately following the starting of the blower cannot possibly extinguish or "blow out" the pilot light, as the brush 15$^m$ is caused to travel some appreciable distance before it can close the circuit by contacting the sector 15$^e$ to start the blower. The gas flame in the meantime has been expanded by the partial opening of the valve to a point entirely past the danger of extinguishment by the blast from the blower. As the blower motor does not come to a dead stop immediately upon breaking of the circuit, but to the contrary, due to the momentum of the rapidly revolving blower fan and motor armature, the blast of air would be continued for a sufficient period and would be of a sufficient magnitude to blow out the low burning pilot flame, the necessity of expanding it both on starting of the blower, as well as when stopping it, becomes apparent.

When the thermostat next responds to a rise in room temperature to again close the circuit for the magnet 16$^g$, of the heat regulator switch mechanism, this magnet again operates to permit the shaft 13$^a$ to make a half revolution in the same manner above described. During this operation of the shaft, the pilot light is again increased to a full flame, as heretofore described, and then the circuit for the blower motor is broken by the brush 15$^m$ moving out of engagement with the constant sector 15$^e$, and thus the aspiration of the liquid fuel discontinued, and upon a completion of the half revolution the gas valve is again closed so that the pilot light is reduced to a small flame.

Figure 10:
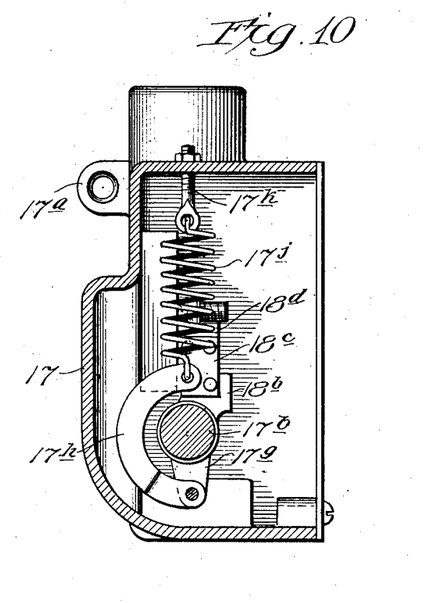
Figs. 10, 11, 12 and 13 are, respectively, sectional views taken on lines 10—10, 11—11, 12—12 and 13—13 of Fig. 9.
Figure 11:
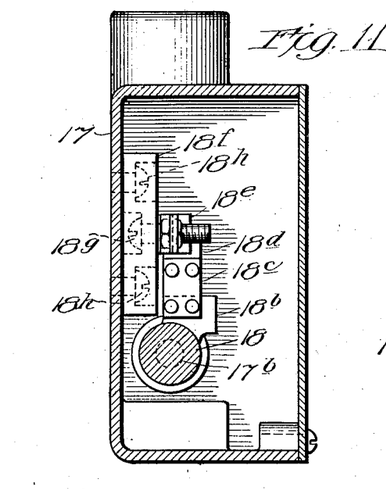

Having now described the normal operation of the apparatus, I will now set forth the operation of the various emergency devices. In the event that the pilot light is not burning when the liquid fuel is supplied to the combustion chamber, this liquid fuel is then drained from the combustion chamber, through the drain pipe 20$^b$ into the receptacle 20. In normal position, with the arms 17$^f$, from which the drain receptacle 20 is suspended in its up position, as shown, the arm 17$^j$, and the end of the spring sector 17$^h$ to which it is attached, will be in a position slightly forward of the vertical diametrical center of the member 17$^b$, as shown at X in Fig. 12, and will have rotated said member to a position whereby the knife switch is closed and the fuel valve 12$^c$ is opened, the spring 17$^j$ functioning at this time to hold the parts in this position. When an inch or two of liquid has accumulated in the receptacle 20, sufficient force will have been supplied to the arm 17$^f$ to initiate a rotative movement to the member 17$^b$. As stated above, the normal position of the member 17$^b$ and the integral arm 17$^g$ is as shown in Fig. 10,—that is, with the end of the arm to which the sector 17$^h$ is secured, slightly forward of the diametrical center of the member 17$^b$ and with the spring 17$^j$ under full tension, tending to revolve it contra-clockwise with the flattened portion 17$^l$ of the "lost motion" connection between 17$^b$ and 18 occupying the position as shown by the full lines in Fig. 12. So the only duty or work to be performed by the accumulated liquid in receptacle 20 is to move the arm 17$^g$ from a position forward of the center line as shown at X, Fig. 12, to a position back of this center line as shown at Y, it having at the same time rotated the flattened portion 17$^l$ to the position shown by the dotted lines in Fig. 12. The instant arm 17$^g$ passes to a point back of the center line, the direction of pull of the spring, aided by the weight of the liquid in the receptacle, is reversed, imparting a clockwise motion to member 18, throwing the knife switch open with a snap, closing down the blower motor, and closing valve 12$^c$ in the fuel line, the entire device remaining in this "shut down" condition until the receptacle is emptied and arm 17$^f$ raised, restoring all parts to normal position.

To meet the contingency of the rather remote possibility of draining the entire contents of the supply tanks on to the basement floor by the flooding of the float chamber 12 through failure of the needle valve, due to possible lodgment of dirt or foreign matter on the valve seat, the drain 20ᶜ leading from the float chamber to the same receptacle 20 is provided. This drain, if the float chamber becomes flooded, will conduct the fuel into the receptacle 20, which will immediately function, as above described, and close the fuel valve 12ᶜ which, as stated, is located between the supply tanks and the float chamber.

It is often desirable that the burner mechanism be controlled by boiler conditions (pressure in connection with the steam boiler, and temperature in connection with the hot water boiler), rather than room temperature, as it frequently happens in connection with a very cold house on a cold morning that steam pressure or requisite water temperature will be reached long before the requisite room temperature. In order to meet with this contingency, I provide a supplemental switch D (Fig. 20), which is actuated by a sylphon device E controlled in the usual manner by the pressure in a steam boiler or temperature in a hot water boiler such as F. The operation of this switch will be readily understood by reference to this diagrammatic view in which I have indicated the various electrical controlling circuits. Referring to this diagram, it will be seen that one of the terminals of the magnet 16ᵍ, which controls the heat-regulator-operated switch, is connected to one pole of the battery C, while the other terminal is connected to the brush 16ʰ carried by the cam 16. The lug or post 16ⁱ with which this brush engages, is connected by means of the conductor 26 to one terminal of the thermostat B, while the other post 16ᵏ is connected by means of the conductor 27 to the opposite terminal of the thermostat. The movable member of the thermostat is connected by means of the conductor 25 to the upper contact of the three point switch D. The middle contact of this switch is connected by means of the conductor 28 to the other terminal of the battery C. The lower contact of this switch is connected to the conductor 27 which is connected to the lug or post 16ᵏ, thus placing one side of the thermostat B and the switch D in parallel. When the sylphon E expands, due to the increased pressure in the boiler, the contact member 24, which is connected to the sylphon by the connecting member 23, is moved down into the position shown, thus temporarily cutting out of circuit the room thermostat and placing the actuating circuits under the control of the sylphon E. This control of the heat regulator will be maintained until the pressure at the boiler has subsided, when the contact member 24 will be returned to normal position, thus again cutting in circuit the thermostat and cutting out the sylphon, and in this manner again throwing the control of the fire back on the room thermostat.

I have also indicated in Fig. 20 the circuit for the motor C. One terminal of the motor is connected by conductor 21 to one side of the main source of current, such as the city line, while the other side is connected to the opposite side of said source by conductor 22 which passes through the heat-regulator-operated switch 15ˡ and the safety switch 18.

It will thus be seen that I have devised a very efficient mechanism which can be very readily and easily substituted for the solid fuel burners now being employed, in which most efficient results are obtained and in which the control is entirely automatic, and in which very effective emergency devices are provided to meet all and any abnormal conditions that may arise. While I have illustrated and described one particular embodiment of my invention, it will be understood that I do not wish to be limited to the exact construction shown and described, but that various changes and modifications may be made without departing from the spirit and intent of my invention.

What I claim as my invention is:—

1. In combination, a heating device including a fire-box, a liquid fuel burning combustion chamber mounted within said fire-box and independent thereof, a liquid fuel atomizer for spraying liquid fuel into said combustion chamber, and means for igniting said fuel, said combustion chamber operating to substantially confine said flame within said chamber and to prevent same from impinging against the walls of said fire-box.

2. In combination, a heating device including a fire-box, a liquid fuel burning combustion chamber capable of ready insertion into and withdrawal from said fire-box, a liquid fuel atomizer for spraying liquid fuel into said combustion chamber, and means for igniting said fuel, said combustion chamber operating to substantially confine said flame within said chamber and to prevent same from impinging against the walls of said fire-box.

3. In combination, a heating device including a fire-box, a liquid fuel burning combustion chamber mounted within said fire-box and independent thereof, means for spraying liquid fuel and air in said combustion chamber, means for igniting said fuel, said combustion chamber operating to confine the sprayed fuel and air within said chamber until the oxygen of the air has united with the combustible of the sprayed fuel in sufficient quantity to bring about a complete combustion of the fuel.

4. In combination, a heating device including a fire-box, a liquid fuel burning combustion chamber mounted within said fire-box and independent thereof, means for spraying liquid fuel and air in said combustion chamber, means for igniting said fuel, said combustion chamber being provided with side and end walls which coöperate in bending the flame of the ignited fuel back on itself so as to form a zone of intense heat, the sprayed fuel being projected into said zone of intense heat in the combustion chamber, and retained therein until sufficient quantity of oxygen from the air projected into the chamber has united with the combustible of the sprayed fuel to bring about complete combustion.

5. In combination, a heating device including a fire-box, a liquid fuel burning combustion chamber mounted within said fire-box and independent thereof, means for spraying liquid fuel and air in said combustion chamber, means for igniting said fuel, said combustion chamber being provided with suitable confining walls whereby formation of $CO_2$ gas is effected within the combustion chamber.

6. In temperature producing and controlling mechanism, the combination of a liquid fuel burning mechanism, electrically-operated means adapted to stop and start said liquid fuel burning mechanism, means responsive to temperature variations adapted to control said electrically-operated means, and automatic means independent of said electrically-operated means to stop said liquid fuel burning mechanism.

7. In temperature producing and controlling mechanism, the combination of a combustion chamber, electrically-operated means for spraying liquid fuel into said chamber, means responsive to temperature variations adapted to control said electrically-operated means, means for igniting said sprayed liquid fuel, and means controlled by an accumulation of said liquid fuel in the event of failure of said ignition means to stop the operation of said electrically-operated means.

8. In temperature producing and controlling mechanism, the combination of a combustion chamber, a fuel nozzle associated therewith, liquid fuel and air connections to said nozzle, electrically operated means for supplying air to said nozzle to thereby atomize liquid fuel, means in said combustion chamber for atomizing said liquid fuel, and means responsive to conditions in said chamber arising through failure of said ignition means adapted to discontinue the operation of said electrically-operated means.

9. In temperature producing and controlling mechanism, the combination of a combustion chamber, a fuel nozzle associated therewith, liquid fuel and air connections to said fuel nozzle, electrically-operated means for supplying air to said nozzle to thereby atomize the liquid fuel, means in said combustion chamber for igniting said atomized fuel, and means controlled by an accumulation of said atomized fuel upon failure of said ignition means to stop the operation of said electrically-operated means.

10. In temperature producing and controlling mechanism, the combination of a combustion chamber, a liquid fuel atomizer in said combustion chamber, means for supplying liquid fuel to said atomizer, a drain connected to said combustion chamber, a receptacle associated with said drain for receiving liquid therethrough from said combustion chamber, electrically-operated means for supplying air to said atomizer, a switch in the circuit of said electrically-operated means, an arm controlling said switch, a spring connected to said arm and operating in one position to hold said switch closed, a connection from said arm to said receptacle whereby the weight of the accumulation of liquid in said receptacle rotates said arm to thereby cause said spring to operate to move said arm to open the circuit of said electrically-operated means.

11. In a liquid fuel burning mechanism, a liquid fuel atomizer, a source of supply for said liquid fuel, a fuel line from said source of supply to said atomizer, a valve in said line, a float chamber in said line adapted to maintain the liquid at a predetermined level in said chamber, and automatic means adapted to close said valve on an abnormal rise of liquid in said chamber beyond the predetermined level.

12. In temperature producing and controlling mechanism, the combination of a liquid fuel burning apparatus, ignition means therefor comprising a pilot flame and automatic means for momentarily enlarging said flame.

13. In temperature producing and controlling mechanism, the combination of a liquid fuel atomizer, electrically-operated means adapted to actuate said atomizer, means for igniting said atomized liquid, and means responsive to temperature variations arranged to control said electrically-operated means and said ignition means.

14. In temperature producing and controlling mechanism, the combination of a liquid fuel atomizer, electrically-operated means adapted to actuate said atomizer, a pilot flame for igniting said atomized liquid, and means responsive to temperature variations arranged to control said electrically-operated means and said pilot flame.

15. In temperature producing and controlling mechanism, the combination of a combustion chamber, a liquid fuel atomizer associated with said combustion chamber, means for supplying liquid fuel to said atomizer, a pilot flame for igniting said atomized fuel, and automatic means for starting said fuel supply means into operation and for momentarily enlarging said pilot flame.

16. In temperature producing and controlling mechanism, the combination of a combustion chamber, a liquid fuel atomizer associated with said combustion chamber, electrically-operated means for supplying liquid fuel to said atomizer, a pilot flame in said combustion chamber for igniting said atomized fuel, automatic means for closing the circuit of said electrically-operated means to thereby supply fuel to said atomizer, and means for momentarily enlarging said pilot flame when said electrically-operated means are started in operation.

17. In temperature producing and controlling mechanism, the combination of a combustion chamber, a liquid fuel atomizer associated with said combustion chamber, electrically-operated means for supplying liquid fuel to said atomizer, a pilot flame in said combustion chamber for igniting said fuel, an automatically-controlled mechanism for first enlarging said pilot flame then starting said electrically-operated means into operation to thereby supply liquid fuel to said atomizer and then again reducing said pilot flame.

18. In temperature producing and controlling mechanism, the combination of a combustion chamber, a liquid fuel atomizer associated with said combustion chamber, electrically-operated means for supplying liquid fuel to said atomizer, a pilot flame in said combustion chamber for igniting said atomized fuel, means for starting and stopping said electrically-operated means and for momentarily enlarging said pilot flame both when said electrically-operated means are started into operation and when said means are stopped.

19. In temperature producing and controlling mechanism, the combination of a combustion chamber, a liquid fuel atomizer associated with said combustion chamber, a pilot flame in said combustion chamber for igniting said atomized fuel, a gas pipe connected to said pilot flame, a normally closed valve in said gas pipe, a by-pass around said valve and permitting a small amount of gas to be supplied to said pilot flame whereby the same burns with a small flame, and automatically-controlled means for supplying liquid fuel to the atomizer and for momentarily opening said valve to thereby enlarge said pilot flame.

20. In temperature producing and controlling mechanism, the combination of a combustion chamber, a liquid fuel atomizer associated with said combustion chamber, a pilot flame in said combustion chamber for igniting said liquid fuel, automatically-controlled mechanism for supplying liquid fuel to said atomizer and for momentarily enlarging said pilot flame when said fuel supply means are started into operation, and means controlled by an accumulation of liquid fuel upon failure of said ignition means to stop the supply of fuel to said atomizer.

21. In temperature producing and controlling mechanism, the combination of a combustion chamber, a liquid fuel atomizer adjacent to said combustion chamber, a boiler associated with said combustion chamber, temperature-controlled means for supplying liquid fuel to said atomizer, and means responsive to boiler conditions for rendering inoperative said temperature-controlled means and for rendering the fuel supply means dependent upon boiler conditions.

22. In temperature producing and controlling mechanism, the combination of a combustion chamber, a liquid fuel atomizer adjacent to said combustion chamber, a boiler associated with said combustion chamber, electrically-operated means for supplying liquid fuel to said atomizer, a thermostat for controlling the circuit of said electrically-operated means, and means associated with said boiler responsive to said boiler conditions for cutting out of circuit said thermostat and for closing an alternative circuit through said electrically-operated means.

23. In temperature producing and controlling mechanism, the combination of a combustion chamber, a liquid fuel atomizer adjacent to said combustion chamber, a boiler associated with said combustion chamber, electrically-operated means for supplying liquid fuel to said atomizer, a thermostat for controlling said electrically-operated means, and means responsive to boiler conditions independent of said thermostat for controlling said electrically-operated means.

24. In temperature producing mechanism, the combination of a liquid fuel atomizer, electrically-operated means adapted to actuate said atomizer, means for igniting said liquid fuel, a boiler or other heat-absorbing medium associated with said atomizer, and means outside of and independent of said heat-absorbing medium responsive to temperature variations arranged to control said electrically-operated means and said ignition means.

Signed by me at Chicago, Illinois, this 14 day of November, 1919.

ALBERT B. FRENIER.